US009755811B2

United States Patent
Tidestav et al.

(10) Patent No.: US 9,755,811 B2
(45) Date of Patent: Sep. 5, 2017

(54) METHOD, COMPUTER PROGRAM AND APPARATUS FOR TRANSMISSION SIGNAL RANK DETERMINATION

(75) Inventors: Claes Tidestav, Bålsta (SE); Johan Hultell, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 175 days.

(21) Appl. No.: 14/409,164

(22) PCT Filed: Jun. 25, 2012

(86) PCT No.: PCT/EP2012/062232
§ 371 (c)(1),
(2), (4) Date: Dec. 18, 2014

(87) PCT Pub. No.: WO2014/000759
PCT Pub. Date: Jan. 3, 2014

(65) Prior Publication Data
US 2015/0139188 A1     May 21, 2015

(51) Int. Cl.
*H04W 4/00* (2009.01)
*H04L 5/00* (2006.01)
(Continued)

(52) U.S. Cl.
CPC ......... *H04L 5/0073* (2013.01); *H04B 7/0486* (2013.01); *H04L 5/0032* (2013.01);
(Continued)

(58) Field of Classification Search
CPC ...... H04B 7/024; H04B 7/063; H04B 7/0486; H04B 7/0632; H04L 5/0044;
(Continued)

(56) References Cited

U.S. PATENT DOCUMENTS

| 2011/0194632 A1* | 8/2011 | Clerckx | H04B 7/024 375/260 |
| 2012/0140706 A1* | 6/2012 | Doppler | H04L 5/0044 370/328 |
| 2013/0329594 A1* | 12/2013 | Davydov | H04B 7/0486 370/252 |

FOREIGN PATENT DOCUMENTS

KR   10-2011-0093560 A   8/2011

OTHER PUBLICATIONS

Clerckx, et al., "Ranks Recommendation-based Coordinated Scheduling for Interference Mitigation in Cellular Networks", Global Telecommunications Conference, IEEE, Dec. 5, 2011, 6 pages.
(Continued)

*Primary Examiner* — Kwang B Yao
*Assistant Examiner* — Harun Chowdhury
(74) *Attorney, Agent, or Firm* — Patent Portfolio Builders, PLLC

(57) ABSTRACT

The present disclosure relates to a method (20) for transmission signal rank determination performed in a base station node (3) of a communication system (1). The base station node (3) serves a first cell (9) and the first cell (9) has a neighboring cell (8) served by a neighboring base station node (2). The base station node (3) is configured for multiple-input, multiple output communication with a first wireless device (7). The method (20) comprises receiving (21), from a node (2); (10) of the communication system (1), information related to the neighboring cell (8), and determining (22), based on the received information, a signal rank of a data transmission to the first wireless device (7) located within the first cell (9).

13 Claims, 2 Drawing Sheets

(51) Int. Cl.
  *H04B 7/04* (2017.01)
  *H04W 36/18* (2009.01)
  *H04W 72/06* (2009.01)
  H04B 7/024 (2017.01)
  H04W 88/08 (2009.01)

(52) U.S. Cl.
  CPC ........... *H04L 5/0057* (2013.01); *H04W 36/18* (2013.01); *H04W 72/06* (2013.01); *H04B 7/024* (2013.01); *H04W 88/08* (2013.01)

(58) Field of Classification Search
  CPC ................. H04L 5/0057; H04L 5/0073; H04L 25/03343; H04L 5/0032; H04W 72/06; H04W 36/18
  USPC .................. 370/252, 328, 329, 331; 375/260
  See application file for complete search history.

(56) References Cited

OTHER PUBLICATIONS

IP Wireless, "Intercell Intereference Cancellation for E-UTRA", 3GPP TSG RAN WG1 LTE Ad Hoc, Cannes, France, Jun. 27-30, 2006, Tdoc R1-061894. Agenda Item 7.1, 6 pages.

Samsung, "Interference mitigation based on rank restriction and recommendation", 3GPP TSG RAN WG1 Meeting #60, San Fransisco, USA, Feb. 22-26, 2010, R1-101175, Agenda Item 7.2.5, 8 pages.

\* cited by examiner

METHOD, COMPUTER PROGRAM AND APPARATUS FOR TRANSMISSION SIGNAL RANK DETERMINATION

CROSS REFERENCE TO RELATED APPLICATION(S)

This application is a 35 U.S.C. §371 National Phase Entry Application from PCT/EP2012/062232, filed Jun. 25, 2012, the disclosure of which is incorporated by reference.

The technology disclosed herein relates generally to the field of wireless communication systems, and in particular to transmission signal rank determination and adaptation within such wireless communication systems.

BACKGROUND

The amount of traffic in wireless communication systems is increasing rapidly. A user nevertheless expects high quality communication to be provided and various efforts are made to keep the user satisfaction, for example providing increased throughput by means of MIMO, and by developing different interference limiting strategies.

Multiple-input Multiple-output (MIMO) technology is thus an effort to improve communication performance and offers significant increases in data throughput and link range without additional bandwidth or increased transmit power. In MIMO multiple antennas are used at the transmitter to transmit multiple independent data streams to the receiver. As an example, in dual-stream MIMO, the receiver uses two receive antennas to extract the two data streams, and suppresses one data stream while recovering the other. Under good radio conditions such dual-stream MIMO transmissions can double the user rates. The transmitter typically chooses the number of data streams to transmit based on channel quality feedback received from the receiver. The number of independent transmission streams is called the rank of the signal and the process of selecting the number of streams is called rank adaptation.

Inter-cell interference is a main factor that limits performance cellular wireless communication systems and there are receivers designed to suppress or cancel interference from neighbor cells. In particular, receivers with interference suppression (IS) capabilities are being introduced and may increase user satisfaction. Such receivers use multiple antennas and/or advanced algorithms to suppress interference from transmissions in neighboring cells. The IS receivers provide large gains particularly in cell-edge performance, and a user located close to the cell border and subject to interference from a small number of interference sources has very effective interference suppression when using such IS receiver. It may be assumed that IS receivers are able to remove more than 90% of the interference power from a single interference source. However, this IS efficiency is significantly reduced as multiple interferers need to be cancelled.

As the wireless traffic within the communication system increases, there is a constant strive to find new ways to combat interference and provide improved performance for the increasing number of users.

SUMMARY

An object of the present disclosure is to meet the above desire and to overcome or at least alleviate one or more of the above mentioned short-comings.

The object is, according to a first aspect, achieved by a method for transmission signal rank determination performed in a base station node of a communication system. The base station node serves a first cell and the first cell has a neighboring cell served by a neighboring base station node. The base station node is configured for multiple-input, multiple output communication with a first wireless device. The method comprises receiving, from a node of the communication system, information related to the neighboring cell; and determining, based on the received information, a signal rank of a data transmission to the first wireless device located within the first cell.

The base station node thus takes into account possible effect of its MIMO transmissions on users in neighboring cells. An improved performance is obtained for users having receivers provided with interference suppression capabilities by limiting the signal rank of transmissions in adjacent cells. Particularly users located close to cell borders will obtained a highly improved performance.

The object is, according to a second aspect, achieved by a base station node in a communication system for transmission signal rank determination. The base station node is configured to serve a first cell and the first cell has a neighboring cell that is served by a neighboring base station node. The base station node is configured for multiple-input, multiple output communication with a first wireless device. The base station node comprises a processing unit configured to: receive, from a node of the communication system, information related to the neighboring cell, and determine, based on the received information, a signal rank of a data transmission to the first wireless device located within the first cell.

The object is, according to a third aspect, achieved by a computer program for a base station node of a communication system for transmission signal rank determination. The base station node is configured to serve a first cell and the first cell has a neighboring cell that is served by a neighboring base station node. The base station node is configured for multiple-input, multiple output communication with a first wireless device. The computer program comprises computer program code, which, when run on a processing unit of the base station node, causes the processing unit to perform the steps of: receiving, from a node of the communication system, information related to the neighboring cell, and determining, based on the received information, a signal rank of a data transmission to the first wireless device located within the first cell.

The object is, according to a fourth aspect, achieved by a computer program product comprising a computer program as above, and computer readable means on which the computer program is stored.

Further features and advantages of the invention will become clear upon reading the following description and the accompanying drawings.

DETAILED DESCRIPTION OF EMBODIMENTS

Figure 1:
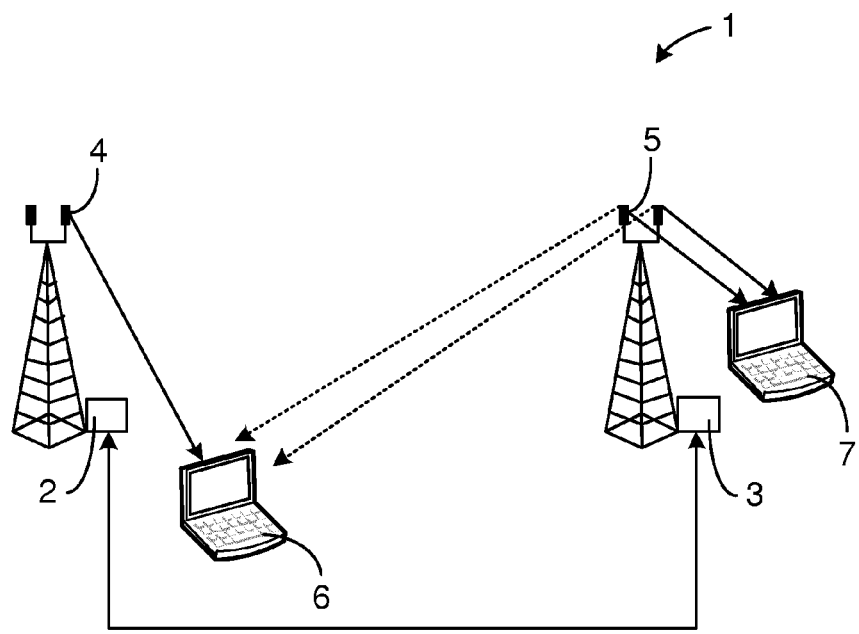
FIGS. 1 and 2 illustrate schematically an environment in which embodiments of the invention may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates schematically an exemplifying environment in which embodiments of the present disclosure may be implemented. In particular, FIG. 1 illustrates a communication system 1 comprising a number of base station nodes 2, 3 (two illustrated in the figure) configured to provide wireless communication links for a number of wireless devices 6, 7. At least one of the base station nodes 3 is configured for multiple-input, multiple output (MIMO) communication with the wireless devices 6, 7. The base station nodes 2, 3 comprise respective antenna devices 4, 5 for the transmission and reception of signaling to/from the wireless devices 6, 7. In the following the base station node 3 to the right is denoted first base station node 3 or simply base station node, and the base station node 2 to the left is denoted second base station node 2 or neighboring base station node (neighboring to the first base station node).

With single-user MIMO, several transmit antennas are used for transmitting independent streams to one receiver, whereas for multi-user MIMO, the independent streams go to different receivers. MIMO schemes are further classified by the number of transmit antennas and receive antennas that are used. For example, 2×2 MIMO indicates that two transmit antennas are used to transmit to receivers with 2 receive antennas.

The wireless device 6, 7 is a device able to receive and/or transmit wirelessly, and is in particular MIMO-enabled. Further, the wireless device 6, 7 may also comprise an interference suppression (IS) receiver, configured to remove interference power from an interference source. The IS receiver may use a combination of multiple receiver antennas and advanced algorithms to suppress interference. As mentioned in the background section, the effectiveness to suppress interference typically decreases as the number of interferers increase, or equivalently, as the rank of the interference increases. As an example, a linear receiver with n receiver antennas can cancel no more than n−1 interferers. In order for such receiver to work at its full potential, the present disclosure presents in various aspects, ways to limit the rank of the interference, or equivalently, to limit the number of independent streams that the receiver is subject to. It is noted that for wireless devices having receivers without the capability to reject inter-cell interference (IS capable receivers), the rank of the inter-cell interference is of no relevance.

The term "wireless device" 6, 7 should be interpreted to encompass various types of devices such as for example mobile phones, smart phones, or laptops. Depending on type of device, and sometimes also depending on communication system in which it is used, the wireless device 6, 7 may be denoted differently, for example user equipment or mobile device.

Still with reference to FIG. 1, the base station node 2, 3 is configured to serve the wireless devices 6, 7 located within its one or more coverage areas, also denoted cells. The base station node 2, 3 may, as a particular example be an evolved Node B, also denoted eNB, in case the communication system 1 is a Long Term Evolution (LTE) system. It is noted that different communication systems use different terms for denoting a base station node. The communication system 1 may for example be a communication system adopting High Speed Packet Access (HSPA) standard or the LTE standard.

As another note on vocabulary it is noted that in LTE, the term "layer" is used for denoting number of independent transmission signals, while HSPA uses the term "stream".

In FIG. 1, the first base station node 3 serves a first wireless device 7 that is able to receive MIMO transmissions, and possibly also able to transmit using MIMO. The first base station node 3 transmits using MIMO to the first wireless device 7. In prior art, the decision to use several transmission streams (two illustrated in the figure, by the two unbroken lines) would be made by the first base station node 3 based on radio conditions, e.g. channel quality, reported to it by the first wireless device 7.

A second wireless device 6 comprises IS capabilities and is being served by the second base station node 2 (being a neighboring base station to the first base station node 3). However, the effectiveness of the IS receiver of the wireless device 6 is reduced as the number of interferers increases. That is, the second wireless device 6 served by the second base station node 2 may experience performance degradation due to the MIMO transmissions of the first base station node 3. In the particular example of FIG. 1, the second wireless device 6 experiences an interference of rank 2 (illustrated by the hatched arrows from the first base station node 3) and it would need to remove the interference created by two interference sources. That is, the multiple transmission streams act as independent interference sources.

The decrease in performance for the IS capable second wireless device 6 can be significantly larger than the MIMO gain experienced by the first wireless device 7. Further, if the second wireless device 6 is located close to the cell border, it may already have rather weak radio channel conditions and would particularly well need the performance gain that could be achieved by its IS receiver.

Briefly, in an aspect of the present disclosure, the base station node 3 takes into account if there are wireless devices in adjacent cells that would suffer from the MIMO transmission. In various embodiments, on the transmitting side, MIMO may be selected only if there are no or a very small degradation for wireless devices in adjacent cells.

Figure 2:
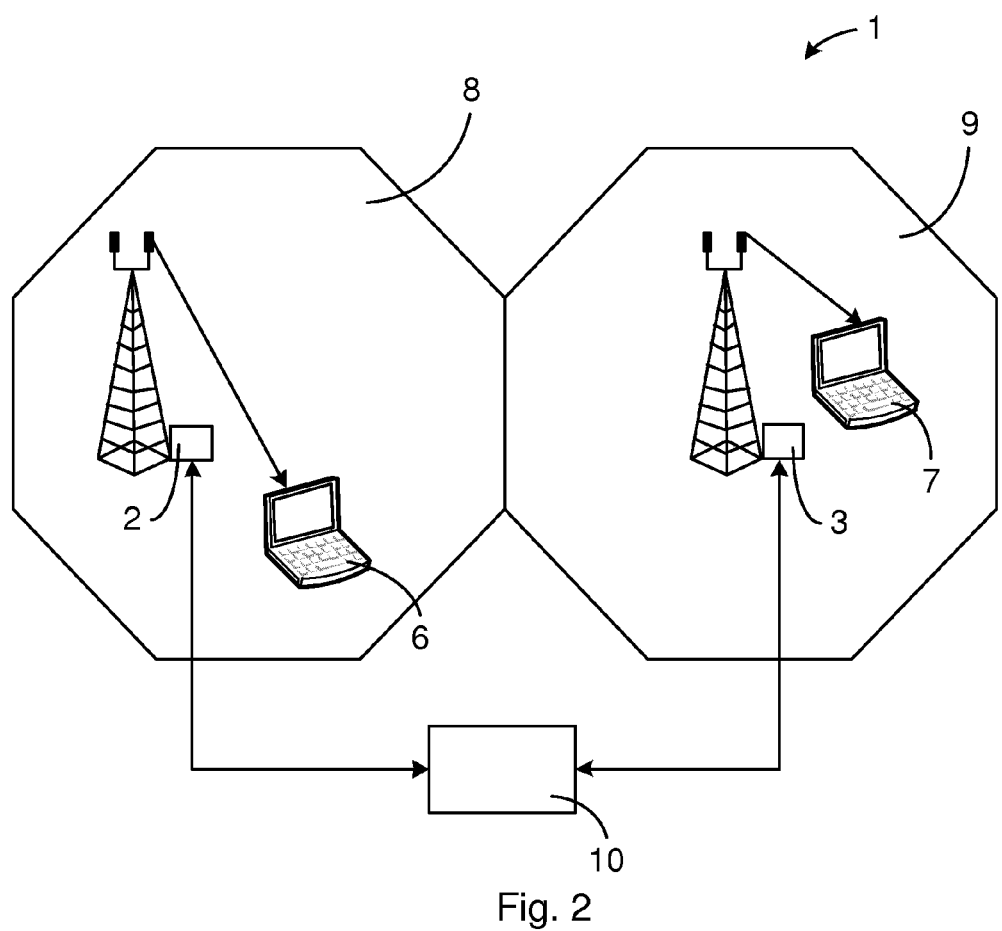
Figure 3:
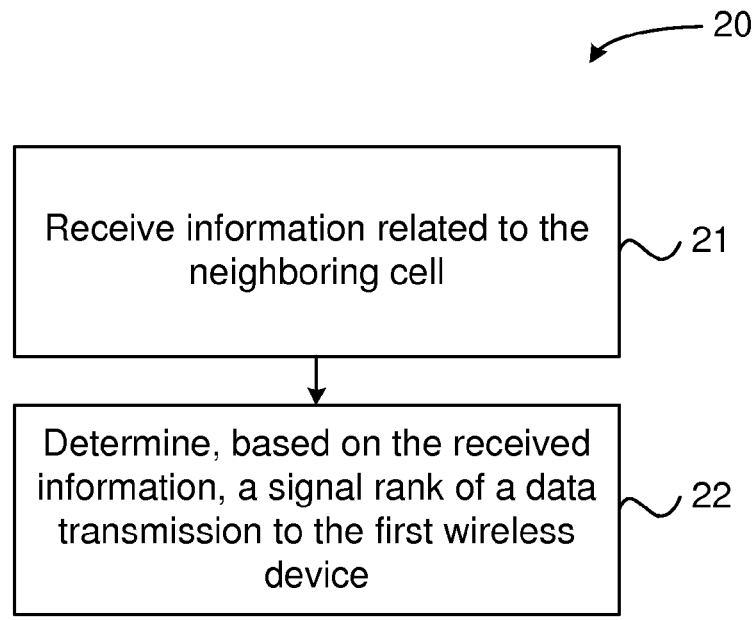
FIG. 3 is a flow chart of a method in an aspect of the present disclosure.

FIG. 2 illustrates the first and second base station nodes 3, 2 of FIG. 1, with their respective coverage area, or cell, indicated. The first base station node 3 serves a first cell 9 and the second base station node 2 serves a second cell 8. The base stations 2, 3 are configured to exchange information, either directly or via an intermediate node. The base stations 2, 3 may both be separately connected to a network node 10, for example a radio network controller, and the exchange of information may then be accomplished via the network node 10. That is, the first base station node 3 sends information to the network node 10, which forwards the information to the second base station node 2, and vice versa. In addition or as an alternative, the base station nodes 2, 3 may be directly interconnected, in a wired or wireless manner, with each other and thereby exchange information.

In an embodiment, the first base station node 3 is configured to receive, from the second base station 2 or another node e.g. the network node 10, information that the second base station 2 has an active IS enabled wireless device 6 within its coverage area. The first base station node 3 is configured to select transmission signal rank for transmissions to the first wireless device 7 based on this information. For example, if the IS receiver of the second wireless device 6 is capable of suppressing interference of rank 2, then the first base station node 3 selects rank 1 for its transmission to the first wireless device 7. This selection may be made irrespective of what the first wireless device 7 has suggested as transmission rank. More generally, the first base station node 3 selects a rank that is less than the interference rank that the second wireless device 6 is able to suppress.

In another embodiment, the first base station node 3 is configured to select transmission signal rank for the first wireless device 7 based on the information that there is an active wireless device 6 located close to the cell-edge of the second cell 8. In line with the above embodiment, the first base station node 3 is configured to select rank 1 if the second wireless device 6 is capable of suppressing interference of rank 2, or more generally, configured to select a transmission signal rank less than n, e.g. n−1, if the second wireless device 6 is capable of suppressing interference of rank n.

In still another embodiment, the first base station node 3 is configured to select transmission signal rank for the first wireless device 7 based on the information that there is an active wireless device 6 located close both to the cell-edge of the second cell 8 and to the first base station node 3. An active wireless device 6 located close to the cell-edge of the second cell 8 is located at a large distance from its serving base station, i.e. from the second base station node 2, and therefore typically has a large pathloss. If the active wireless device 6 at the same time also is located at a small distance from the first base station node 3, i.e. it would typically have a small pathloss to this base station node 3, then the risk of this wireless device 6 greatly suffering from a MIMO transmission from the first base station node 3 would be particularly high.

In different communication systems, for example in HSPA, a soft handover functionality is provided, and if the communication system 1 is a system comprising such functionality, information that is readily available from the soft handover functionality may be used. A wireless device in soft handover is connected to more than one cell, and the set of cells to which the wireless device is connected is denoted active set. The radio channel conditions between the wireless device and the base stations serving the cells are typically of similar magnitude. One of the cells in the active set is called the serving cell. The actual data transmission is, in e.g. HSPA, performed from the base station node that handles the serving cell. With reference to FIG. 2, the second wireless device 6 is on the cell border between the first cell 9 and the second cell 8, and it is likely that the second wireless device 6 is in soft handover with the first and second cells 8, 9. The first base station node 3 is aware of that there is a second wireless device 6 which has the first cell 9 in its active set and the first base station node 3 is further aware of that it its not serving that second wireless device 6. The first base station node 3 may therefore use this information to determine that MIMO transmissions towards the first wireless device 7 would have a detrimental effect on the second wireless device 6, which is in soft handover, and therefore select transmission signal rank towards the first wireless device 7 accordingly.

In the above embodiments, the information exchange between the first base station 3 and the second base station 2 may be rather slow, as instantaneous scheduling decisions are not taken into account.

If the communication link between the first and second base station nodes 3, 2 is fast, then the transmission signal rank determination may be based on information such as scheduling decisions. For example, with a low-latency communication link between the first base station node 3 and the second base station node 2, MIMO transmissions from one of the base station nodes may be avoided at time instances when the other base station node has scheduled transmissions to an IS capable wireless device.

In an embodiment thus, the first base station node 3 is configured to receive, from the second base station 2 or another node e.g. the network node 10, information that the second base station 2 has a transmission scheduled in a cell 8 that it serves. The first base station node 3 is configured to select transmission signal rank to the first wireless device 7 based on this information. For example, as soon as there is a transmission scheduled in the second cell 8, then the first base station node 3 selects a single-stream transmission, and when the scheduled transmission has been effectuated, the first base station node 3 may increase the transmission signal rank to the first wireless device 7.

In another embodiment, the first base station node 3 is configured to select transmission signal rank for transmissions to the first wireless device 7 based on the information that there is a wireless device 6 close to the cell-edge in the adjacent cell 8 for which a transmission is scheduled.

In still another embodiment, the first base station node 3 is configured to select transmission signal rank for transmissions to the first wireless device 7 based on the information that there is a transmission scheduled for a wireless device 6 located close both to the cell-edge of the second cell 8 and to the first base station node 3.

The base station node 3 may also, in the various embodiments, take into account information on whether the wireless device 6 that could be interfered by a multi-stream transmission has IS capabilities. For example, the base station node 3 may be configured to restrict the number of transmission streams only when there is a receiver with IS capability in a neighboring cell.

In the various embodiments described above, the cell 9 of the first base station node 3 has been described as having only a single neighboring cell (i.e. the second cell 8). It is to be noted that the cell 9 of the first base station node 3 typically has further adjacent cells, served by other base station nodes. The information on which the first base station node 3 determines the transmission signal rank may be based on information received from any one or more such base station node(s). Any combination of information received from the base station nodes serving the adjacent cells may be used in determining the transmission signal rank.

In still other embodiments, the gain for a wireless device of using MIMO is weighed against the interference caused to another, i.e. against the performance loss of another wireless device. The described embodiments may be modified to use the transmission signal rank e.g. as suggested by the wireless device, if its performance is significantly higher than if using the lower transmission signal rank. For example, the embodiment of selecting transmission signal rank to the first wireless device 7 based on the information that the second base station 2 has an active IS enabled wireless device 6 within its coverage area may in an embodiment be modified to selecting transmission signal rank 1 as long as there is any active wireless device in a neighboring cell and the rank 2 performance for the intended wireless device is not more than a selected percentage better than the rank 1 performance. If both criteria are fulfilled, i.e. there is an active wireless device present and rank 2 performance would not be significantly better than rank 1 performance, then it can be assumed that the performance gain for the interfered wireless device if it would be able to suppress interference is more important than using multi-stream transmission to the first wireless device. It is noted that the various different criteria may be used in such trade-off evaluations.

Figure 4:
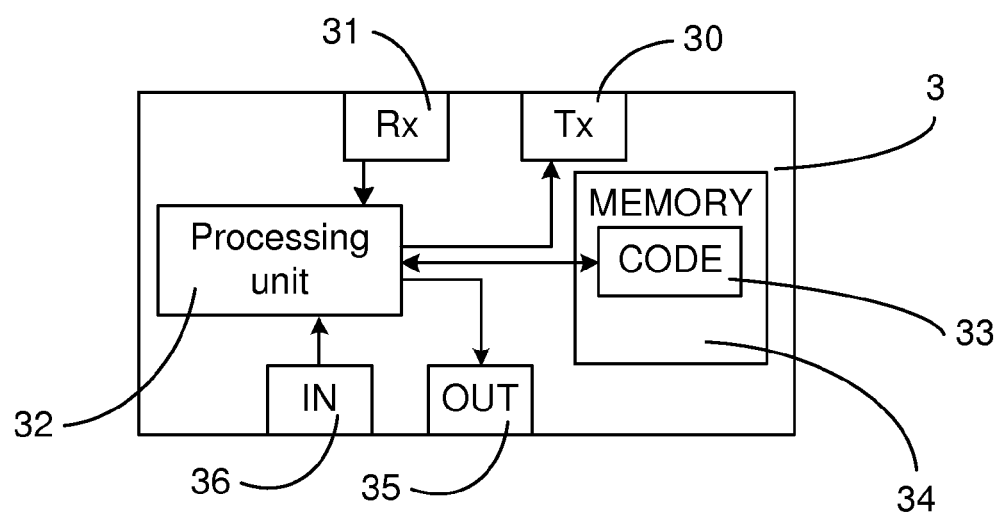
FIG. 4 illustrates an exemplifying base station node comprising means for implementing embodiments of the methods.

FIG. 4 is a flow chart of a method 10 for transmission signal rank determination in an aspect of the present disclosure. The method 20 is performed in a base station node 3 of a communication system 1, as described e.g. in relation to FIG. 1. The base station node 3 thus serves a first cell 9, and the first cell 9 has a neighboring cell 8 that is served by a neighboring base station node 2. The base station node 3 is configured for MIMO communication with a first wireless device 7. The method 20 comprises receiving 21, from a node 2; 10 of the communication system 1, information related to the neighboring cell 8. The node from which the base station node 3 receives the information may be the base station node 2 serving the neighboring cell 8 or another node, e.g. the network node 10 of FIG. 2. It is also noted that the base station node 3 could receive the information from two or more different nodes, e.g. both from the base station node 2 serving the neighboring cell 8 and the network node 10.

The method 20 further comprises determining 22, based on the received information, a rank of a data transmission to the first wireless device 7 located within the first cell 9 and thus served by the base station node 3.

In various embodiments, the information comprises one or more of: active status of a second wireless device 6 in the neighboring cell 8, active status of a second wireless device 6 located at a cell border of the neighboring cell 8, pathloss from the base station node 3 to an active second wireless device 6 in the neighboring cell 8, pathloss from the neighboring base station node 2 to an active second wireless device 6 in the neighboring cell 8, a transmission being scheduled in the neighboring cell 8, a transmission being scheduled to a second wireless device 6 located at a cell border of the neighboring cell 8, active status of a second wireless device 6 in the neighboring cell 8 comprising means to suppress interference.

It is noted that in the above examples, "pathloss from" could be exchanged for "distance from", since the pathloss experienced by a wireless device is closely related to its distance from a base station node (i.e. distance between transmitting part and receiving part).

In an embodiment, the information comprises active status of a second wireless device 6 in the neighboring cell 8, wherein the second wireless device 6 is able to suppress interference of rank n. That is, the information that there is an active second wireless device 6 comprising means to suppress interference of rank n. The determining 22 of the transmission signal rank of a data transmission to the first wireless device 7 located within the first cell 9 comprises determining the transmission signal rank to be less than n. The base station node 3 thus adapts the transmission signal rank of transmission to the first wireless device 7 so that the second wireless device 6 is able to suppress interference caused by the transmission.

In a variation of the above embodiment, the transmission signal rank is determined to be less than n unless a performance parameter based on use of transmission signal rank n in transmission to the first wireless device 7 is determined to be a predetermined value higher than a performance parameter based on use of transmission signal rank less than n in transmission to the first wireless device 7, for which case the transmission signal rank is determined to be equal to n. Examples of such performance parameters comprise estimated channel quality, estimated throughput and functions thereof.

That is, if the gain for the first wireless device 7 when using the highest possible transmission signal rank is "high enough", then this rank is chosen irrespective of its potential interfering effects. This can be seen as if the gain for the first wireless device 7 of using the highest possible transmission signal rank being, in some regard, higher than the reduced performance for the second wireless device 6, then this highest possible transmission signal rank is used even though the user of the second wireless device 6 experiences a lower satisfaction.

In an embodiment, the information comprises information on a transmission being scheduled to a second wireless device 6 located in the neighboring cell 8. The determining 22 comprises determining the transmission signal rank to be equal to one for transmissions to the first wireless device 7 which at least partly overlap with the transmissions scheduled to the second wireless device 6. This embodiment may be generalized in that the transmission signal rank for the first wireless device 7 is determined to be equal to a rank that the second wireless device 6 is able to handle, i.e. able to suppress interference from.

In an embodiment, the information comprises information on an active status of a second wireless device 6 located at a cell border between the neighboring cell 8 and the first cell 9, wherein the information is based on soft-handover information. As described earlier, for communication systems implementing soft handover functionality, information about wireless devices not being served by the base station node 3 is still readily available owing to the fact that the base station node 3 has information about one of its cell(s) being in the active set of the wireless device.

In various embodiments, the determining a transmission signal rank of a data transmission to the first wireless device 7 may further be based on other factors such as a channel quality indicated by the first wireless device 7 and/or the resource availability in the base station node 3. That is, in addition information that is used in prior art to determine a transmission signal rank, the neighbor cell situation is also taken into account in the various embodiments.

FIG. 4 illustrates an exemplifying base station node comprising means for implementing embodiments of the methods. The base station node is part of a communication system 1, as described earlier, and is configured for transmission signal rank determination. The base station node 3 is configured to serve a first cell 9 and the first cell 9 has a neighboring cell 8 served by a neighboring base station node 2. The base station node 3 is configured for multiple-input, multiple output communication with a first wireless device 7. The base station node 3 comprises a processing unit 32, e.g. a central processing unit (CPU), microcontroller, digital signal processor (DSP), etc., capable of executing software instructions stored in a computer program product 34 e.g. in the form of a memory. The processing unit 32 is connected to an input device 36 of the base station node 3 by means of which it receives information from other base station nodes and/or other nodes, such as the network node 10, of the communication system 1. The processing unit 32 is connected to an output device 35 of the base station node 3 by means of which it transmits information to other base station nodes and/or other nodes of the communication system 1.

The base station node 3 further comprises a receiver device 31 by means of which it receives signaling from wireless devices 6, 7, typically via some other device, e.g. antenna units 5, of the base station node 3. The base station node 3 further comprises a transmitter device 30 by means of which it can transmit signaling to wireless devices 6, 7, typically via some other device, e.g. antenna units, of the base station node 3.

It is noted that although only one processing unit 32 is illustrated in FIG. 4, the implementation may comprise distributed hardware so that several processing units are used rather than one when running the software. It is further noted that the base station node 3 comprises yet additional components, conventionally used for enabling wireless communication, for example components for signal processing functions such as modulation, demodulation, signal extraction etc.

The described methods and algorithms or parts thereof for use in signal transmission rank determination may be implemented e.g. by software and/or application specific integrated circuits in the processing unit 32. To this end, the base station node 3 may further comprise a computer program 33 stored on the computer program product 34.

The processing unit 32 may be configured to perform the steps of a desired embodiment, of the various embodiments described. The processing unit 32 is, in an embodiment, configured to receive, from a node 2; 10 of the communication system 1, information related to the neighboring cell 8, and determine, based on the received information, a signal rank of a data transmission to the first wireless device 7 located within the first cell 9.

In an embodiment, the information comprises: active status of a second wireless device 6 in the neighboring cell 8 and/or active status of a second wireless device 6 located at a cell border of the neighboring cell 8 and/or pathloss from the base station node 3 to an active second wireless device 6 in the neighboring cell 8 and/or a transmission being scheduled in the neighboring cell 8 and/or a transmission being scheduled to a second wireless device (6) located at a cell border of the neighboring cell 8 and/or active status of a second wireless device 6 in the neighboring cell 8 comprising means to suppress interference.

In an embodiment, the information comprises active status of a second wireless device 6 in the neighboring cell 8, the second wireless device 6 being able to suppress interference of rank n. The processing unit 32 is configured to determine the signal rank of a data transmission to the first wireless device 7 located within the first cell 9 by determining the transmission signal rank to be less than n.

In an embodiment, the processing unit 32 is configured to determine the transmission signal rank to be less than n unless a performance parameter based on use of signal rank n in transmission to the first wireless device 7 is determined to be a predetermined value higher than a performance parameter based on use of transmission signal rank less than n in transmission to the first wireless device 7, for which case the processing unit 32 is configured to determine the transmission signal rank to be equal to n.

In various embodiments, the processing unit 32 is configured to determine the signal rank of a data transmission to the first wireless device 7 further based on a channel quality indicated by the first wireless device 7.

In an embodiment, the information comprises information on a transmission being scheduled to a second wireless device 6 located in the neighboring cell 8 and wherein the processing unit 32 is configured to determine the rank to be equal to one for transmissions to the first wireless device 7 which at least partly overlap with the transmissions scheduled to the second wireless device 6.

With reference still to FIG. 4, the present disclosure also encompasses the mentioned computer program 33 for a base station node 3 of a communication system 1 for transmission signal rank determination. The base station node 3 is configured to serve a first cell 9 and the first cell 9 has a neighboring cell 8 served by a neighboring base station node 2. The base station node 3 is configured for multiple-input, multiple output communication with a first wireless device 7. The computer program 33 comprises computer program code, which, when run on a processing unit 32 of the base station node 3, causes the processing unit 32 to perform the steps of: receiving, from a node 2; 10 of the communication system 1, information related to the neighboring cell 8, and determining, based on the received information, a signal rank of a data transmission to the first wireless device 7 located within the first cell 9.

A computer program product 34 is also provided comprising a computer program 33 as described above, and computer readable means on which the computer program 33 is stored. The computer program product 34 may be any combination of read and write memory (RAM) or read only memory (ROM). The computer program product 34 may also comprise persistent storage, which, for example can be any single one or combination of magnetic memory, optical memory, or solid state memory.

The invention claimed is:

1. A method for transmission signal rank determination performed in a base station node of a communication system, the base station node serving a first cell and the first cell having a neighboring cell served by a neighboring base station node, the base station node being configured for multiple-input, multiple output communication with a first wireless device, the method comprising:

receiving, from a node of the communication system, information related to the neighboring cell, wherein the information comprises active status of a second wireless device in the neighboring cell, the second wireless device being able to suppress interference of rank n, and wherein the information further comprises information on the neighboring base station node scheduling a transmission in the neighboring cell, determining, based on the received information, a signal rank of a data transmission to the first wireless device located within the first cell, wherein the determining of the signal rank of the data transmission to the first wireless device located within the first cell comprises determining the transmission signal rank to be less than n, and increasing the signal rank of the data transmission to the first wireless device after the neighboring base station node has completed a scheduled transmission in the neighboring cell.

2. The method of claim 1, wherein the information comprises one or more of: the active status of the second wireless device in the neighboring cell, the active status of the second wireless device located at a cell border of the neighboring cell, pathloss from the base station node to the active second wireless device in the neighboring cell, pathloss from the neighboring base station node to the active second wireless device in the neighboring cell, a transmission being scheduled to the second wireless device located at a cell border of the neighboring cell, the active status of the second wireless device in the neighboring cell comprising a means to suppress interference.

3. The method of claim 1, wherein the transmission signal rank is determined to be less than n unless a performance parameter based on use of transmission signal rank n in transmission to the first wireless device is determined to be a predetermined value higher than a performance parameter based on use of transmission signal rank less than n in transmission to the first wireless device, for which case the transmission signal rank is determined to be equal to n.

4. The method of claim 1, wherein the information comprises information on the data transmission being scheduled to the second wireless device located in the neighboring cell and wherein the determining comprises determining the transmission signal rank to be equal to one for data transmission to the first wireless device which at least partly overlap with the data transmission scheduled to the second wireless device.

5. The method of claim 1, wherein the information comprises information on the active status of the second wireless device located at a cell border between the neighboring cell and the first cell, the information being based on soft-handover information.

6. The method of claim 1, wherein the determining the signal rank of the data transmission to the first wireless device is further based on a channel quality indicated by the first wireless device.

7. A base station node in a communication system for transmission signal rank determination, the base station node being configured to serve a first cell and the first cell having a neighboring cell served by a neighboring base station node, the base station node being configured for multiple-input, multiple-output communication with a first wireless device, the base station node comprising:
an input device configured to receive, from a node of the communication system, information related to the neighboring cell, wherein the information comprises active status of a second wireless device in the neighboring cell, the second wireless device being able to suppress interference of rank n, and wherein the information further comprises information on the neighboring base station node scheduling a transmission in the neighboring cell, and a processor, in operative communication with the input device, configured to:
determine, based on the received information, a signal rank of a data transmission to the first wireless device located within the first cell, wherein to determine the signal rank of the data transmission to the first wireless device located within the first cell, the processor is further configured to determine the transmission signal rank to be less than n, and
increase the signal rank of the data transmission to the first wireless device after the neighboring base station node has completed a scheduled transmission in the neighboring cell.

8. The base station node of claim 7, wherein the information comprises one or more of: the active status of the second wireless device in the neighboring cell, the active status of the second wireless device located at a cell border of the neighboring cell, pathloss from the base station node to the active second wireless device in the neighboring cell, a transmission being scheduled to the second wireless device located at the cell border of the neighboring cell, the active status of the second wireless device in the neighboring cell comprising a means to suppress interference.

9. The base station node of claim 7, wherein the processor is configured to determine the transmission signal rank to be less than n unless a performance parameter based on use of signal rank n in transmission to the first wireless device is determined to be a predetermined value higher than a performance parameter based on use of transmission signal rank less than n in transmission to the first wireless device, for which case the processor is configured to determine the transmission rank to be equal to n.

10. The base station node of claim 7, wherein the processor is configured to determine the signal rank of the data transmission to the first wireless device further based on a channel quality indicated by the first wireless device.

11. The base station node of claim 7, wherein the information comprises information on the data transmission being scheduled to the second wireless device located in the neighboring cell and wherein the processor is configured to determine the transmission signal rank to be equal to one for data transmissions to the first wireless device which at least partly overlap with the data transmissions scheduled to the second wireless device.

12. A computer program for a base station node of a communication system for transmission signal rank determination, the base station node being configured to serve a first cell and the first cell having a neighboring cell served by a neighboring base station node, the base station node being configured for multiple-input, multiple output communication with a first wireless device, the computer program comprising computer program code, which, when run on a processor of the base station node, causes the processor to perform the steps of:
receiving, from a node of the communication system, information related to the neighboring cell, wherein the information comprises active status of a second wireless device in the neighboring cell, the second wireless device being able to suppress interference of rank n, and wherein the information further comprises information on the neighboring base station node scheduling a transmission in the neighboring cell,
determining, based on the received information, a signal rank of a data transmission to the first wireless device located within the first cell, wherein the determining of the signal rank of the data transmission to the first wireless device located within the first cell comprises determining the transmission signal rank to be less than n, and
increasing the signal rank of the data transmission to the first wireless device after the neighboring base station node has completed a scheduled transmission in the neighboring cell.

13. A computer program product comprising a non-transitory computer readable medium storing the computer program of claim 12.

* * * * *